United States Patent Office 3,005,865
Patented Oct. 24, 1961

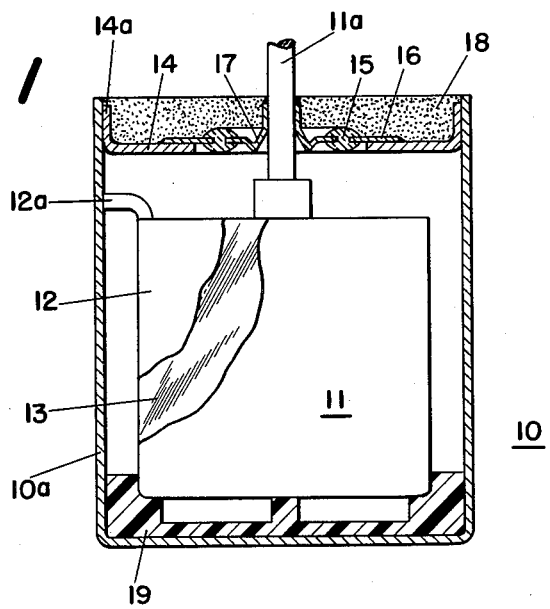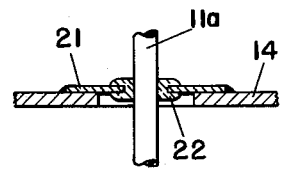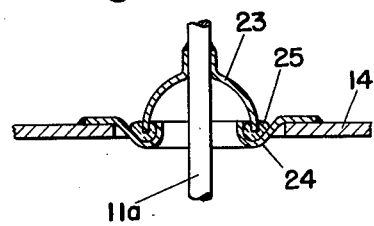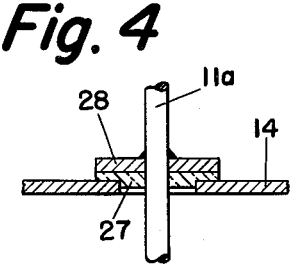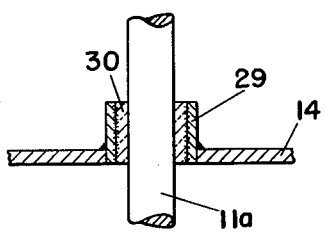

3,005,865
SEALING ASSEMBLY FOR BATTERIES
Erik Jönsson, Fallebo, Oskarshamn, Sweden, assignor to Svenska Ackumulator Aktiebolaget Jungner, Stockholm, Sweden, a corporation of Sweden
Filed Mar. 4, 1959, Ser. No. 797,114
Claims priority, application Sweden Mar. 8, 1958
1 Claim. (Cl. 136—136)

This invention relates to electric batteries either of the primary or secondary type and has for an object the provision of a glass-to-metal seal between the battery posts and the casing of a character which can withstand shocks without rupture of the seal.

It has heretofore been a difficult problem to bring about a fluid-tight seal around the posts and other fittings extending from the inside to the outside of the battery. Where such posts and fittings extend through the walls, generally the lid, there have appeared small cracks or passages permitting capillary movement of electrolyte therethrough. The electrolyte in general has a comparatively low surface tension, thus making it more difficult to seal against capillary movement of the electrolyte through any minute passage which may exist in the sealing area. In this connection, and particularly for batteries of the alkaline type, the casing is frequently made of metal, such as sheet steel. Accordingly, the posts must be insulated from the casing. This complicates the problem of obtaining a fluid-tight seal between the metal post and the metal casing and by means of an insulating material which will remain fluid-tight throughout the life of the battery. Where electrolyte migrates along the walls of the vessel and makes its way out through leaks, there appears a layer of carbonate crystals which form from the carbonization of the alkaline electrolyte. The loss of the electrolyte is to be avoided, and in many cases loss of electrolyte can seriously impair battery performance.

The present invention is particularly applicable to sealed cells, that is, batteries where the electrodes are hermetically sealed and remain sealed during the normal life of the battery. For batteries of this type, it is important that no gases escape from the battery which, if occurring, would upset the equilibrium conditions desired within the cell.

In carrying out the invention in one form thereof there are utilized metal-to-glass seals between the post and the wall of the battery casing through which that post extends. The sealing assembly includes provisions for minimizing the magnitude of the forces which can be applied to the sealing areas. In this manner, there is minimized likelihood of rupture of the seal during the normal life of the battery. The force-minimizing structure may take a number of forms including diaphragm structures which permit relative movement between the post and the battery casing with a gradually decreasing movement toward the sealing area.

For further objects and advantages of the invention, reference is to be had to the following description taken in conjunction with the accompanying drawing, in which:

FIG. 1 is a sectional view of a storage battery including a glass-to-metal seal assembly embodying the present invention; and FIGS. 2–5 are respectively fractional sectional views of additional modifications of the invention.

Referring now to FIG. 1, the storage battery 10 includes a plurality of electrodes 11 and 12 between which there are interposed separators 13. To the casing 10a of sheet metal, steel, there extends a post 12a from electrode or plate 12. The post 12a is welded to the steel casing. The plate assembly at the bottom of the casing 10a is supported on upwardly extending ribs of an insulating member 19 preferably formed of a plastic or synthetic resin material. From the electrode or plate 11 there extends upwardly a post 11a. The post 11a has welded thereto a metal diaphragm 17 with one or more corrugations (only one being illustrated). The outer periphery of the diaphragm 17 terminates within a torus-shaped sealing member 15, of glass. Also terminating within the torus 15 is a metallic washer 16. Its outer periphery overlaps, and is welded to, the cover plate 14 of the battery. This cover plate has an upwardly extending flange 14a and is preferably welded to the vertical walls of the casing 10a. Molten plastic 18, such as a sealing compound of the type normally used in storage batteries, has been illustrated as covering the top plate or lid 14. The plastic layer 18 fills the cup-shaped upper portion of the housing and, as shown in the drawing, preferably is spaced upwardly from the diaphragm 17. Any blows or undue vibration which cause movement of the post 11a are resisted by the plastic layer 18. Such movement as does occur takes place within the region of the corrugations of diaphragm 17 and with a minimum movement of the torus or sealing ring 15. Some movement of that ring can occur, this being permitted by the outer washer-shaped member 16. The sealing assembly as a whole maintains the casing 10a gas-tight and liquid-tight under normal and severe operating conditions.

As shown in FIG. 2, a wall 14 of the housing 10a has welded to it a metal plate 21. Within an opening in the plate 21 there is provided a sealing element 22 of glass. The inner periphery of member 21 is embedded within the element 22, and that element is also fused to the post 11a. Thus there is provided a hermetic seal between casing wall 14 and post 11a, with the member 21 providing a shock-absorbing means to minimize damage to the glass element 22 in the event of blows or undue shocks applied to the post 11a.

Where additional protection is desired against possible failure of the glass-to-metal sealing regions, the structure of FIG. 3 may be utilized. A bell-shaped element 23 of metal has an upper neck portion welded to the post 11a. The periphery of the enlarged open end extends into, is embedded in, a glass ring, torus-shaped, which is supported in the cup-shaped end of a metal element 24 which has its outer end portion welded to the wall 14. The glass ring 25 is fused to the cup-shaped inner end of member 24. The bell-shaped member 23 of resilient material, together with the member 24 also of resilient material, such as thin steel, provides substantial elasticity in the assembly through which the post 11a extends.

In some applications provision for movement of post 11a need not be made. In these applications, the structures of FIGS. 4 and 5 are particularly applicable. In FIG. 4 a cylindrical washer-shaped element 27, with a depending center portion of reduced area extending into the opening in plate 14, is through the contacting surfaces bonded to that plate. To the upper face of the glass element 27 a metallic member 28 is fused, this element 28 in turn being welded to the post 11a.

For additional bracing of post 11a against movement, the structure of FIG. 5 may be utilized. In FIG. 5 a vertically extending tubular element 29 of metal is welded to the plate 14 in the region of the post-receiving opening thereof. Within the tubular element 29, and fused to the inner surface thereof, is a tubular insert 30 of glass. This glass insert or collar 30 has its inner surface fused to the post 11a. A rugged fluid-tight seal is thus provided.

In each of the modifications of the invention the materials utilized at the sealing areas have substantially the same coefficients of heat expansion. More particularly, there can be utilized what those skilled in the art refer to as iron-sealing glass and having a coefficient of heat expansion which is substantially the same as that of iron. Glass of this character has a comparatively low melting point and thus lends itself to fusion with the iron. Ordinary soda glass and lead glass can be utilized in combination with metal alloys having the same, or substantially the same, heat expansion qualities, such for example, as nickel-iron. Soldering glass is an example of another suitable material for use in each of the embodiments of the invention. The soldering glasses include borate-glass, boro-silicate-glass, alumo-borate-glass, and alumo-boro-phosphate-glass.

The present invention may be practiced by utilizing powdered glass to form the glass elements. The powdered glass will be pressed together and pre-sintered before the application of heat to fuse the same to the metal surface. This same technique may be utilized with ceramic materials to provide the gas-tight seal between the metal and the electrical insulating material comprising the glass or ceramic material.

While preferred embodiments have been illustrated, it is to be understood that further modifications may be made within the scope of the appended claim.

In the claim reference is made to fusing and welding, these terms being used in the broad sense to denote fluid-tight bonds and to include the equivalent of welding, such as brazing, soldering, and the like.

What is claimed is:

The combination with an electric battery having a metal casing through an opening in one wall of which casing extends a battery terminal post, of a sealing assembly insulating said post from said casing and hermetically sealing said opening comprising at least two annular metallic elements disposed in coaxial relationship with each other and with said post and extending radially one from the other outwardly from said post, said elements having their adjacent peripheries glass-bonded together, one of said elements having at its inner periphery a sealing area bonded to said post and the other of said elements having a sealing area at its outer periphery bonded to said casing, said one of said elements consisting of a yieldable diaphragm which has a structural configuration in an annular region intermediate its said glass-bonded periphery and said post to provide movement in said region preferential to movement in the remaining regions of said one annular element, said movement in said region being in a direction axially of said post for minimizing the magnitude of forces developed at said sealing areas as the result of shocks applied to the battery of magnitudes which produce relative movement.

References Cited in the file of this patent

UNITED STATES PATENTS

| | | |
|---|---|---|
| 1,262,581 | Gardiner | Apr. 9, 1918 |
| 1,266,911 | Bouton | May 21, 1918 |
| 1,364,861 | Bliss | Jan. 11, 1921 |
| 2,121,590 | Espe | June 21, 1938 |
| 2,147,417 | Bahls | Feb. 14, 1939 |

OTHER REFERENCES

Ser. No. 352,040, Gonningen (A.P.C.), published May 18, 1943.